Figure 1:
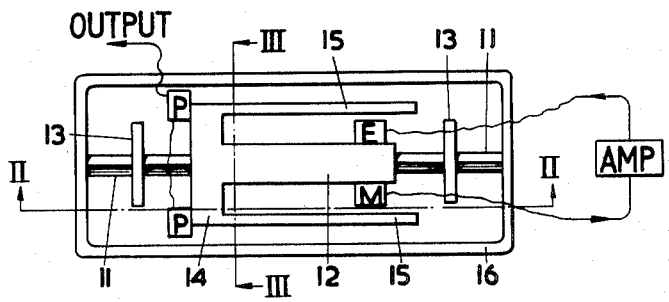

May 17, 1966  G. H. HUNT ETAL  3,251,231
GYROSCOPE APPARATUS
Filed July 5, 1962

United States Patent Office 3,251,231
Patented May 17, 1966

3,251,231
GYROSCOPE APPARATUS
Geoffrey Harold Hunt, Farnham, and Anthony Edward Walter Hobbs, Shinfield, England, assignors to Minister of Aviation, in Her Majesty's Government of the United Kingdom of Great Britain and Northern Ireland, London, England
Filed July 5, 1962, Ser. No. 207,628
Claims priority, application Great Britain, July 11, 1961, 25,058/61
7 Claims. (Cl. 73—505)

This invention relates to gyroscope apparatus in which structures including at least one oscillatory or vibratory body are employed instead of the rotary bodies of conventional gyroscopes.

In gyroscope apparatus according to the invention one of two oscillatory bodies which are balanced and have equal natural frequencies of oscillation about the axis of a common torsion bar mounting by which they are carried for oscillation in antiphase, includes a two tine tuning fork arrangement disposed with the tines extending in the general direction of the axis of the torsion bar mounting equidistant from said axis at opposite sides thereof, and at least one support member extends from a corresponding nodal zone in the length of the torsion bar mounting, whereby deflection of the whole about the axis of the torsion bar mounting brings about responsive oscillation of the two oscillatory bodies when the tuning fork tines are already oscillating and brings about oscillation of the tuning fork tines when the oscillatory bodies are already oscillating.

In a simple case, a torsion bar may extend like a stem from the junction of the roots of the two tines of a tuning fork arrangement which constitutes one of the two oscillatory bodies, to the other body, which latter may be of simple rectangular configuration for example, a single support member extending from a nodal zone intermediately of the length of the torsion bar.

Preferably, however, for greater stability, there are two support members joined respectively with the torsion bar mounting at two nodal zones in the length of the mounting.

Thus, the common torsion bar mounting may include two coaxial torsion bars which are spaced from one another by a member of high torsional rigidity relatively to the two torsion bars, a rigid open frame disposed symmetrically of the axis of the torsion bar being joined at opposite sides thereof to the outer ends of the two torsion bars, respectively, and two support members being joined to the two torsion bars at nodal zones in their lengths, respectively.

In such a case, the two tine tuning fork arrangement may be carried by the member of relatively high torsional rigidity joined to the inner ends of the coaxial torsion bars, to constitute together with said member one of the two oscillatory bodies on the torsion bar mounting, the other of said bodies being constituted by the rigid open frame; or, alternatively, the two tine tuning fork arrangement may be carried by the rigid open frame to constitute together with said frame one of the two oscillatory bodies on the torsion bar mounting, the other of said bodies being constituted by the member of relatively high torsional rigidity joined to the inner ends of the torsion bars.

In all cases it is desirable that all the parts should be integral one with another, as by being formed by machining from a single piece of material.

The invention is illustrated by way of example in the accompanying drawings which are diagrammatic only and not to scale.

Figure 2:
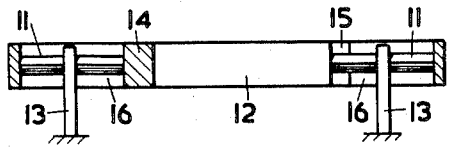
Figure 3:
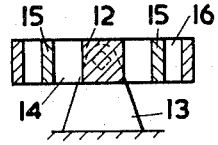
Figure 4:
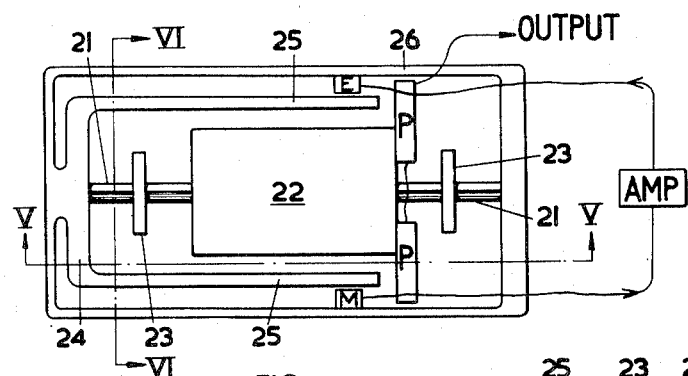
Figure 5:
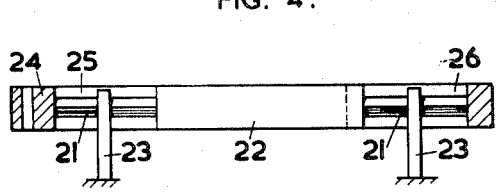
Figure 6:
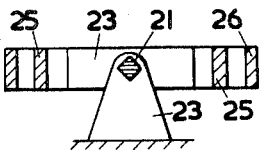

FIGURE 1 is a plan view of a structure in accordance with one form of the invention,
FIGURE 2 is a part sectional view on the line II—II of FIGURE 1 and
FIGURE 3 is a part sectional view on the line III—III of FIGURE 1, whilst
FIGURE 4 is a plan view of a structure in accordance with another form of the invention,
FIGURE 5 is a part sectional view on the line V—V of FIGURE 1 and
FIGURE 6 is a part sectional view on the line VI—VI of FIGURE 1.

Both these structures lend themselves to production by machining from a single piece of material.

As shown in FIGURES 1, 2 and 3 a torsion bar mounting is comprised by two torsion bars 11, 11, a highly rigid bar 12 joining them and two support members 13, 13 joined to the torsion bars 11, 11 at nodal zones intermediately of their lengths. A tuning fork arrangement 14 joined at its base to the bar 12 has its tines 15, 15 extending parallel with the bar 12 at equal distances therefrom at opposite sides thereof. Also, a rigid rectangular frame 16 is joined to the outer ends of the torsion bars 11, 11 at points midway of the lengths of its shorter sides so that it is symmetrical about the axis of the torsion bar mounting.

The arrangement is such that the tuning fork arrangement 14 with the rigid bar 12, on the one hand, and the rigid frame 16, on the other hand, are balanced and have equal natural frequencies of oscillation about the axis of the torsion bar mounting 11, 12, 13. These natural frequencies of oscillation are the same as the natural frequency of oscillation of the tines of the tuning fork arrangement 14. Thus, the bar 12 with the tuning fork 14 and the rigid frame 16 constitute respectively two oscillatory bodies which are resiliently coupled by the torsion bars 11, 11 so that oscillation of the one is accompanied by oscillation of the other in antiphase, just as oscillation of either tine 15 of the tuning fork 14 is accompanied by oscillation of the other tine 15 in antiphase.

When the tuning fork tines 15, 15 are already oscillating, the structure is responsive to deflection of the whole about the axis of the torsion bar mounting. Such deflection produces alternating or oscillatory reaction forces in the structure which bring about responsive oscillation in antiphase of the oscillatory bodies 16 and 12, 14 on the torsion bar mounting. Similarly, when said oscillatory bodies 16 and 12, 14 are already oscillating such deflection results in responsive oscillation of the tuning fork tines 15, 15.

In practice, it is preferred to drive the tuning fork tines. This may readily be done, for example, by means of a regenerative or positive feed back arrangement in which as indicated in FIGURE 1 a drive device E, preferably of capacitative type, is connected to the output of an amplifier AMP to the input of which is connected pick-off means device M, which are preferably of inductive type; further pick-off means P, P which are phase-sensitive, and also preferably of inductive type, being associated with the tuning fork 14 and frame 16 to afford an output signal whose phase is dependent upon the sense of deflection about the torsion bar axis.

Turning now to FIGURES 4, 5, 6 in the structure there shown, two torsion bars 21, 21 have support members 23, 23 joined to them at nodal zones intermediately of their lengths and a rigid rectangular frame 26 is joined at points midway of the lengths of its shorter sides to the outer ends of the torsion bars 21, 21 as in the case of FIGURES 1, 2 and 3. In this structure, however, a tuning fork arrangement 24 having tines 25, 25 is joined to one end of the frame 26, and, the inner ends of the torsion bars 21, 21 are joined by a rigid rectangular section body 22 which is of greater lateral dimensions between the tines 25, 25 than the rigid bar 12 of FIGURES 1, 2 and 3.

In the case of FIGURES 4, 5 and 6 the arrangement is such that the tuning fork arrangement 24 together with the rigid frame 26, on the one hand, and the rectangular section body 22, on the other hand, are balanced and have equal natural frequencies of oscillation about the axis of the torsion bars 21, 21 which are the same as the natural frequency of oscillation of the tuning fork tines 25, 25. Hence, in this case, the frame 26 with the tuning fork arrangement 24 joined thereto and the rectangular body 22 constitute respectively, two oscillatory bodies coupled resiliently by the torsion bars 11, 11 so that oscillation of the one is accompanied by oscillation of the other in antiphase just as oscillation of either tuning fork tine 25 is accompanied by oscillation of the other in antiphase.

As in the case of FIGURES 1, 2 and 3, when the tuning fork tines 25, 25 are already oscillating, deflection of the whole structure about the torsion bar axis brings about responsive oscillation in antiphase of the two bodies 22 and 26, 24 on the torsion bar mounting; and, similarly, when said bodies 22 and 26, 24 are already oscillating deflection of the whole structure about the torsion bar axis brings about responsive oscillation of the tuning fork tines 25, 25.

In the case of FIGURES 4, 5 and 6 also it is preferred to drive the tuning fork arrangement 24 and to take an output or response signal from the frame 26 and/or the body 22 by means, for example, of an amplifier AMP with pick-off means M (preferably of inductive type) and a drive device E (preferably of capacitative type) associated with the tuning fork tines 25, 25 and the frame 26, and phase sensitive pick-off means P,P (also preferably of inductive type) associated with one of the support members 23 and the body 22 and the frame 26, as indicated in FIGURE 4.

Although in both of the structures shown the two oscillatory bodies (16 and 14, 12 or 22 and 26, 24) on the torsion bar mounting have the same angular disposition about the torsion bar axis, this is not essential and, if desired, said bodies may be disposed at any angle the one to another up to ninety degrees.

In oscillatory gyroscope structures according to the invention the oscillatory torsional reaction forces produced by deflection of the oscillating tuning fork tines (or the oscillating bodies on the torsion bar mounting) about the axis of the torsion bar mounting and which bring about the response or output oscillation of the bodies on the torsion bar mounting (or the tuning fork tines) are proportional to the rate of the deflection. Thus, the lighter the damping of the bodies on the torsion bar mounting or of the tuning fork tines, whichever are used for the output, the more nearly will the rate of change of the amplitude of the output or response oscillation correspond to the rate of the deflection, and, the heavier the damping the more closely will the amplitude of the response oscillation correspond to the rate of the deflection.

It is generally desirable that both the tuning fork tines and the bodies on the torsion bar mounting should be very lightly damped.

It will be seen that gyroscope apparatus according to the invention affords an oscillatory response to deflection of the structure about the torsion bar axis of which the phase is dependent upon the sense of the deflection and of which either the rate of change of amplitude (light damping) or the amplitude (heavy damping) is dependent upon the rate of the deflection.

We claim:

1. Gyroscope apparatus comprising two torsion bars disposed coaxially and some distance apart from one another, a member of relatively high torsional rigidity disposed symmetrically of the common axis of the torsion bars and joining the inner ends of the latter, a two tine tuning fork arrangement joined to said member of high torsional rigidity with its tines extending in the general direction of the common axis of the torsion bars equidistant from said axis at opposite sides thereof respectively, a rigid open frame disposed symmetrically of the common axis of the torsion bars and which is joined to the outer ends of the torsion bars, said frame constituting the one and said member of relatively high torsional stability together with the tuning fork arrangement constituting the other of two oscillatory bodies which are balanced and have equal natural frequencies of oscillation about the common axis of the torsion bars, the same as the natural frequency of oscillation of the tuning fork tines, by which bar said bodies are coupled torsionally for oscillation in antiphase about said axis, whereby deflection of the whole about the torsion bar axis will bring about such oscillation of said bodies when the tuning fork tines are already oscillating and oscillation of the tuning fork tines when said bodies are already oscillating; the apparatus also comprising two support members joined respectively to the two torsion bars at nodal zones in the lengths of the latter.

2. Gyroscope apparatus as claimed in claim 1, wherein a regenerative arrangement comprising pick-off means and drive means each operative between a tuning fork tine and the member joining the inner ends of the torsion bars and also amplifier means of which the input and output are connected respectively with said pick-off means and said drive means is provided for driving the tuning fork tines at their natural frequency of oscillation, and wherein phase sensitive output pick-off means are operative between the member joining the inner ends of the torsion bars and the tuning fork arrangement, on the one hand, and the rigid frame, on the other hand.

3. Gyroscope apparatus as claimed in claim 1, wherein the tuning fork tines and the two oscillatory bodies are very lightly damped.

4. Gyroscope apparatus comprising two torsion bars disposed coaxially and some distance apart from one another, a rigid body disposed symmetrically of the common axis of the torsion bars and joining the inner ends of the latter, a rigid open frame disposed symmetrically of the common axis of the torsion bars and joined to the outer ends of the torsion bars, a two tine tuning fork arrangement joined to said rigid frame with its tines extending in the general direction of the common axis of the torsion bars equidistant from said axis at opposite sides thereof respectively, said rigid body constituting the one and said frame together with the tuning fork arrangement constituting the other of two oscillatory bodies which are balanced and have equal natural frequencies of oscillation about the common axis of the torsion bars, the same as the natural frequency of oscillation of the tuning fork tines, by which bars said bodies are coupled torsionally for oscillation in antiphase about said axis, whereby deflection of the whole about the torsion bar axis will bring about such oscillation of said bodies when the tuning fork tines are already oscillating and oscillation of the tuning fork tines when said bodies are already oscillating; the apparatus also comprising two support members joined respectively to the two torsion bars at nodal zones in the lengths of the latter.

5. Gyroscope apparatus as claimed in claim 4, wherein a regenerative arrangement comprising pick-off means and drive means each operative between a tuning fork tine and the rigid frame joined to the outer ends of the torsion bars and also amplifier means of which the input and output are connected respectively with said pick-off means and said drive means is provided for driving the tuning fork tines at their natural frequency of oscillation, and wherein phase sensitive output pick-off means are operative between the rigid body joining the inner ends of the torsion bars and said rigid frame.

6. Gyroscope apparatus as claimed in claim 4, wherein the tuning fork tines and the two oscillatory bodies are very lightly damped.

7. Gyroscope apparatus comprising
two torsion bars disposed coaxially and some distance apart from one another,
a member of relatively high torsional rigidity disposed symmetrically of the common axis of the torsion bars and joining the inner ends of the latter,
a member of relatively high torsional rigidity in the form of an open frame disposed symmetrically of the common axis of the torsion bars and joined to the outer ends of the latter,
a two tine tuning fork arrangement joined to one of said members of relatively high torsional rigidity and oriented for vibration of its tines toward and away from the common axis of the torsion bars,
said one member together with the tuning fork arrangement joined thereto constituting the one, and the other member of relatively high torsional rigidity constituting the other, of two oscillatory bodies which are balanced and have equal natural frequencies of oscillation about the common axis of the torsion bars, the same as the natural frequency of oscillation of the tuning fork tines, by which bars said bodies are coupled torsionally for oscillation in anti-phase about said axis; the apparatus also comprising drive means and pick-off means for the two oscillatory bodies and
two support members joined respectively to the two torsion bars at nodal zones in the lengths of the latter.

References Cited by the Examiner

UNITED STATES PATENTS

| 2,514,250 | 7/1950 | Meredith | 73—505 |
| 2,544,646 | 3/1951 | Barnaby | 33—204.3 |
| 2,627,400 | 2/1953 | Lyman | 73—505 |
| 2,683,596 | 7/1954 | Morrow | 73—505 |
| 2,861,256 | 11/1958 | Hart | 310—24 |
| 2,939,971 | 6/1960 | Holt | 73—505 |
| 3,017,775 | 1/1962 | Entin | 73—505 |

FOREIGN PATENTS 611,011  10/1948  Great Britain.

RICHARD C. QUEISSER, *Primary Examiner.*

ROBERT L. EVANS, *Examiner.*